(12) United States Patent
Chase-Salerno et al.

(10) Patent No.: US 6,247,140 B1
(45) Date of Patent: Jun. 12, 2001

(54) PARALLEL REMOTE ADMINISTRATION OF MIRRORED AND ALTERNATE VOLUME GROUPS IN A DISTRIBUTED DATA PROCESSING SYSTEM

(75) Inventors: Michael S. Chase-Salerno, New Paltz; Richard Ferri, Ulster Park, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/111,626

(22) Filed: Jul. 7, 1998

(51) Int. Cl.$^7$ ...................................................... H02H 3/05
(52) U.S. Cl. ...................................................... 714/2; 714/6
(58) Field of Search .................................. 714/2, 1, 100, 714/20, 6, 5, 3; 713/1, 2

(56) References Cited

U.S. PATENT DOCUMENTS

| | | | |
|---|---|---|---|
| 5,394,532 | 2/1995 | Belsan | 395/425 |
| 5,403,639 | 4/1995 | Belsan et al. | 395/600 |
| 5,430,855 | 7/1995 | Walsh et al. | 395/275 |
| 5,435,004 | 7/1995 | Cox et al. | 395/575 |
| 5,455,926 | 10/1995 | Keele et al. | 395/404 |
| 5,469,560 | 11/1995 | Beglin | 395/439 |
| 5,497,483 | 3/1996 | Beardsley et al. | 395/575 |
| 5,564,011 | 10/1996 | Yammine et al. | 395/182.13 |
| 5,632,012 | 5/1997 | Belsan et al. | 395/182.04 |
| 5,828,888 | * 10/1998 | Kozaki et al. | 395/712 |
| 5,852,713 | * 12/1998 | Shannon | 714/6 |
| 6,052,797 | * 4/2000 | Ofek et al. | 714/6 |
| 6,058,454 | * 5/2000 | Gerlach et al. | 711/114 |

OTHER PUBLICATIONS

IBM publication, (copyright information), *AIX Version 4.3 Commands Reference*, vol. 1, "First Edition", (3 pp.).

IBM publication, *AIX Version 4.3 Commands Reference*, vol. 1, "bootlist Command", (5 pp.) (Oct. 1979).

IBM publication, *AIX Version 4.3 Commands Reference*, vol. 1, "bosboot Command", (7 pp.) (Oct. 1979).

IBM publication, *AIX Version 4.3 Commands Reference*, vol. 2, "Trademarks and Acknowledgements", (2 pp.) (Oct. 1997).

IBM publication, *AIX Version 4.3 Commands Reference*, vol. 2, "extendvg Command", (2 pp.) (Oct. 1997).

IBM publication, *AIX Version 4.3 Commands Reference*, vol. 3, "mirrorvg Command", (4 pp.) (Oct. 1997).

IBM publication, *AIX Version 4.3 Commands Reference*, vol. 4, "reducevg Command", (2 pp.) (Oct. 1997).

IBM publication, *AIX Version 4.3 Commands Reference*, vol. 5, "unmirrorvg Command", (3 pp.) (Oct. 1997).

IBM Technical Disclosure Bulletin, "Improvement of the Mirror Write Consistency Algorithm", vol. 37, No. 02B, Feb. 1994, pp. 255–256.

IBM Technical Disclosure Bulletin, "Reduction of Delay Experienced during Mirror Disk Access Failures", vol. 36, No. 12, Dec. 1993, pp. 601–602.

* cited by examiner

*Primary Examiner*—Robert Beausoleil
*Assistant Examiner*—Rita Ziemer
(74) *Attorney, Agent, or Firm*—Floyd A. Gonzalez, Esq.; Heslin & Rothenberg, P.C.; Lawrence D. Cutter (57) ABSTRACT

A technique for remotely administering one or more nodes of a distributed data processing system to provide mirroring of operating system images, and/or designating of alternate volume groups for the one or more nodes. A new data class is defined in a system data repository (SDR) coupled to a control node of the distributed system. A set of commands are provided to initiate and discontinue mirroring from the control node on a nodal volume group, along with designating alternate volume groups for remote installation on one or more nodes of the system in parallel. An interface to add, delete, modify or display information about nodal volume groups is also provided.

18 Claims, 10 Drawing Sheets fig. 1 fig. 2 fig. 3 fig. 4 fig. 5 fig. 6 fig. 7 fig. 8 fig. 9 fig. 10

PARALLEL REMOTE ADMINISTRATION OF MIRRORED AND ALTERNATE VOLUME GROUPS IN A DISTRIBUTED DATA PROCESSING SYSTEM

CROSS-REFERENCE TO RELATED APPLICATIONS

This application contains subject matter which is related to the subject matter of the following applications, each of which is assigned to the same assignee as this application and filed on the same day as this application. Each of the below-listed applications is hereby incorporated herein by reference in its entirety:

"METHOD FOR PARALLEL, REMOTE ADMINISTRATION OF MIRRORED AND ALTERNATE VOLUME GROUPS IN A DISTRIBUTED DATA PROCESSING SYSTEM," by Chase-Salerno et al., Ser. No. 09/111,378; and "SYSTEM FOR PARALLEL, REMOTE ADMINISTRATION OF MIRRORED AND ALTERNATE VOLUME GROUPS IN A DISTRIBUTED DATA PROCESSING SYSTEM," by Chase-Salerno et al., Ser. No. 09/111,615.

TECHNICAL FIELD

This invention relates to administering operating systems on a distributed data processing system, and more particularly, the invention relates to remote administration of one or more nodes of the data processing system to provide, for example, mirroring of operating system images and/or designating of alternate volume groups for the one or more nodes.

BACKGROUND OF THE INVENTION

Many computer system customers require systems to be available on a seven-day, twenty-four hour basis. One way to provide this high availability is through redundancy so that no component is a single point of failure. In the case of an AIX operating system, i.e., the International Business Machines Corporation's version of the UNIX operating system, redundancy of the operating system image itself is provided via "mirroring" the operating system to separate physical volumes. However, "mirroring" of the operating system on AIX does not lend itself to mirroring on a distributed computer system such as a RISC System/6000 (RS/6000) Scalable POWERparallel Systems (SP) distributed computer system available from International Business Machines Corporation of Armonk, N.Y.

One particular problem in mirroring operating system images on the SP is that the SP has no central point of control for mirroring. No "central point of control" means there is no way to collect and display customer directives regarding mirroring, there is no way to apply mirroring short of logging on to every SP node. Once mirroring is initiated, there is no data available on which nodes are using mirrored volume groups, nor if any nodes are in a failover condition.

Conventionally, if a customer wishes to mirror volume groups, the customer would have to use, for example, IBM Parallel System Support Program (PSSP version 2.1) to install the nodes without mirroring initiated. Post-installation, the customer would log into the node to enter the set of commands to initiate mirroring. The customer would then write an additional short script that would set the bootlist of the node each time the node is booted to reflect the mirrored volume group presence in the list of bootable devices. The customer would then have to repeat this procedure for each node that mirroring is to be initiated on. Once mirroring is initiated, the customer would have to log on to each node to determine which nodes are using mirrored volume groups, and if any node has failed over to a mirrored volume group.

As a related problem, alternate volume groups may need to be created on one or more nodes of the system. A customer may require an alternate volume group when the customer needs to run multiple different copies of the operating system at different times, without forcing a re-install of the node. Different copies of the operating system might be required for different levels of device driver support, or to have "secure" versus "unsecure" levels of data at highly secure installations. Alternate volume groups may provide many of the same problems on the SP as does mirroring. This is again because there is no central point of control for alternate physical volume administration on the SP.

Conventionally, if a customer wishes to use alternate volume groups, for example, to boot a node from different versions of the AIX operating system, the customer would need to enter information via a command or System Management Interface Tool (SMIT) interface to designate the new volume as the volume to install. The customer would then install the alternate volume using, for example, PSSP software. If the customer wishes to change the node to boot from the other alternate device, the customer would have to manually log into the node to modify the bootlist of the node and then reboot the node. As in mirroring, there is no method of determining which nodes are using alternate volume groups short of logging on to every node.

In view of the above, the present invention comprises a method/system of centrally administering alternate and mirrored volume groups of the nodes in a distributed processing system.

DISCLOSURE OF THE INVENTION

Briefly summarized, the present invention comprises in one aspect at least one computer readable medium for storing data usable by a storage controller coupled to a storage device of a distributed processing system. The medium includes a data structure stored within the at least one computer readable medium. The data structure comprises: Node object information usable by the storage controller in identifying at least one target node within the distributed processing system; and a Volume_Group object comprising information on at least one volume group of said at least one target node in the distributed processing system. The Volume_Group object is usable by the storage controller to remotely administer volume groups of the at least one target node of the distributed processing system.

In a further aspect, this invention provides at least one program storage device readable by a machine, tangibly embodying at least one program of instructions executable by the machine to perform a method for administering at least one of a mirrored volume group or an alternate volume group of at least one target node of a computer system. The computer system includes a plurality of processors coupled to a storage controller, the storage controller being coupled to the storage unit. The method includes: storing information in a Node object and a Volume_Group object in the storage unit, the Node object and the Volume_Group object providing information on each volume group of the at least one target node in the computer system; and performing at least one of mirroring of a volume group or designating an alternate volume group of the at least one target node of the computer system. The performing is initiated by the storage controller remote from the at least one target node.

In a still further aspect, an article of manufacture is provided which includes at least one computer usable medium having computer readable program code means embodied therein for administering at least one of a mirrored volume group or an alternate volume group on at least one target node in a distributed processing system having a control node coupled to a system data repository (SDR). The computer readable program code means in the article of manufacture includes: computer readable program code means for causing a computer to store information in a Node object and a Volume_Group object in the SDR, the Node object and the Volume_Group object providing information on each volume group of the at least one target node in the distributed processing system; and computer readable program code means for causing a computer to perform at least one of mirroring of a volume group or designating an alternate volume group of the at least one target node of the distributed processing system.

In a yet further aspect of the present invention, an article of manufacture is provided which includes at least one computer usable medium having computer readable program code means embodied therein for administering a volume group on at least one target node of a distributed processing system having multiple processors, one processor being designated a control node and one or more other processors being designated a target node. The control node is coupled to a system data repository (SDR). The computer readable program code means in the article of manufacture includes: computer readable program code means for causing a computer to store information in a Node object and a Volume_Group object in the SDR, the Node object and the Volume_Group object providing information on each volume group of the at least one target node in the distributed processing system; and computer readable program code means for causing a computer to perform at least one of adding, deleting, modifying, or displaying information about at least one volume group of the at least one target node of the distributed processing system using at least one of the Node object and the Volume_Group object in the SDR.

To restate, this invention provides for central administration of one or more remote nodes of a distributed data processing system. The invention allows for mirroring of operating system images and/or designating of alternate volume groups for the one or more remote nodes. The invention described herein provides a new data class in the system data repository (SDR) to retain information about volume groups at the nodes of the system. This central repository is coupled to the control node for central administration of the physical volumes of the nodes. An ability to create, modify, and delete this new data class (or volume group information) is also provided, as is the ability to form new volume groups for each node based upon information in the repository. A set of commands is provided to initiate and/or discontinue mirroring on multiple nodal volume groups of the system in parallel from the control node. Further, the invention provides for administering the bootlist on a node or set of nodes remotely and in parallel from the control node, again allowing for mirroring and alternate volume groups. Also, the bootlist can be set from the control node to correctly provide for automatic failover to backup volume groups in the nodes of the distributed system.

Advantageously, a system administrator or user does not have to log on to the individual nodes or use, for example, a remote AIX shell to administer the volume groups of the nodes. From the central workstation, the user can invoke a series of SMIT panels to input information about the mirroring or alternate volume groups of the nodes. This information is stored in the existing Node objects and in a new object, referred to herein as the "Volume_Group object", of the SDR. Once the information about mirroring and alternate volume groups is entered in the SDR, the user can initiate mirroring in one of three ways, i.e., by installing the node, by rebooting the node, or immediately by invoking a mirroring/unmirroring routine in accordance with the present invention. Alternate volume groups can also be designated and installed from the control node. Based on SDR data, the control node can determine which volume group is the boot volume group.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

The following definitions of terms are provided to facilitate discussion of a detailed embodiment of the present invention.

Physical Volume (PV)
    An individual fixed disk drive attached to a node.
Volume Group (VG)
    A group of PVs, or fixed disk drives. The advantage of a Volume Group is that a group can be managed as a single entity to higher layers of software.
Root Volume Group (RVG)
    A special kind of Volume Group, the RVG contains all information about the operating system.
Mirroring a Volume Group
    Mirroring a Volume Group is a method of simultaneously writing all information to two separate physical volumes so that one volume becomes a backup or "mirrored" copy of the other. When mirroring a Root Volume Group to separate volumes, each mirror becomes an independently bootable version of the operating system.
Alternate Volume Group
    When a workstation has multiple different copies of the operating system to boot from, such that the copies are actually different versions or levels of the operating system, it is said to have Alternate Volume Groups.
Failover/Takeover
    The condition when a volume group fails due to hardware or software errors, and the exact duplicate of the group (i.e., the mirror) becomes the active volume group.
SDR
    Or System Data Repository, is a database of system administrative information on the SP. It contains such information as IP addresses for network adapters of every node, the hostname for each node, the client/server relationship with other nodes, etc.
bootlist
    A list of RS/6000 bootable devices in the order that they will be tried when booting a node. All devices in the bootlist will be tried in order until a device is found that has a bootable AIX image.
SMIT
    System Management Interface Tool, a part of AIX that provides a textual or graphical full screen interface for the system administrator to perform administrative tasks, such as setting hostnames or IP addresses, modifying device information, etc.
Control Workstation
    An RS/6000 workstation that provides a central point for system administration for many SP functions. The control workstation is not an SP node; it connects to the SP nodes via an ethernet LAN.
node_list
    A list of a group of nodes.

Using the above definitions, and to briefly summarize, the present invention comprises a method and system for centrally administering (preferably in parallel) alternate and/or mirrored volume groups of one or more nodes of a distributed data processing system. The approach is implemented in one example by building upon existing AIX and PSSP operations. The invention provides:

a new data class in the SDR to retain information about volume groups;
    a set of commands to initiate and discontinue mirroring on a nodal volume group;
    a method to designate an alternate volume group for remote installation on a node;
    an interface to add/delete/modify or display information about nodal volume groups; and
    a method of setting the bootlist correctly to provide for automatic failover to a backup physical volume on a node.

With central administration from the SP control workstation in accordance with this invention, a customer can invoke a new series of SMIT panels to input information about the mirroring or alternate volume groups of a node. This information will be stored in the existing Node object and a new object, labeled herein the "Volume_Group object", held in the SDR. There will also be a command to display information about the known volume groups of a node. Once the information about mirroring and alternate volume groups is entered in the SDR, a customer can initiate mirroring in one of several ways, e.g., by installing the node, by rebooting the node, or by invoking a new mirroring script described hereinbelow. The customer can also designate in accordance with this invention, an alternate volume to be installed. Based on SDR data, the node can then determine which volume group is the boot volume group.

Figure 1:
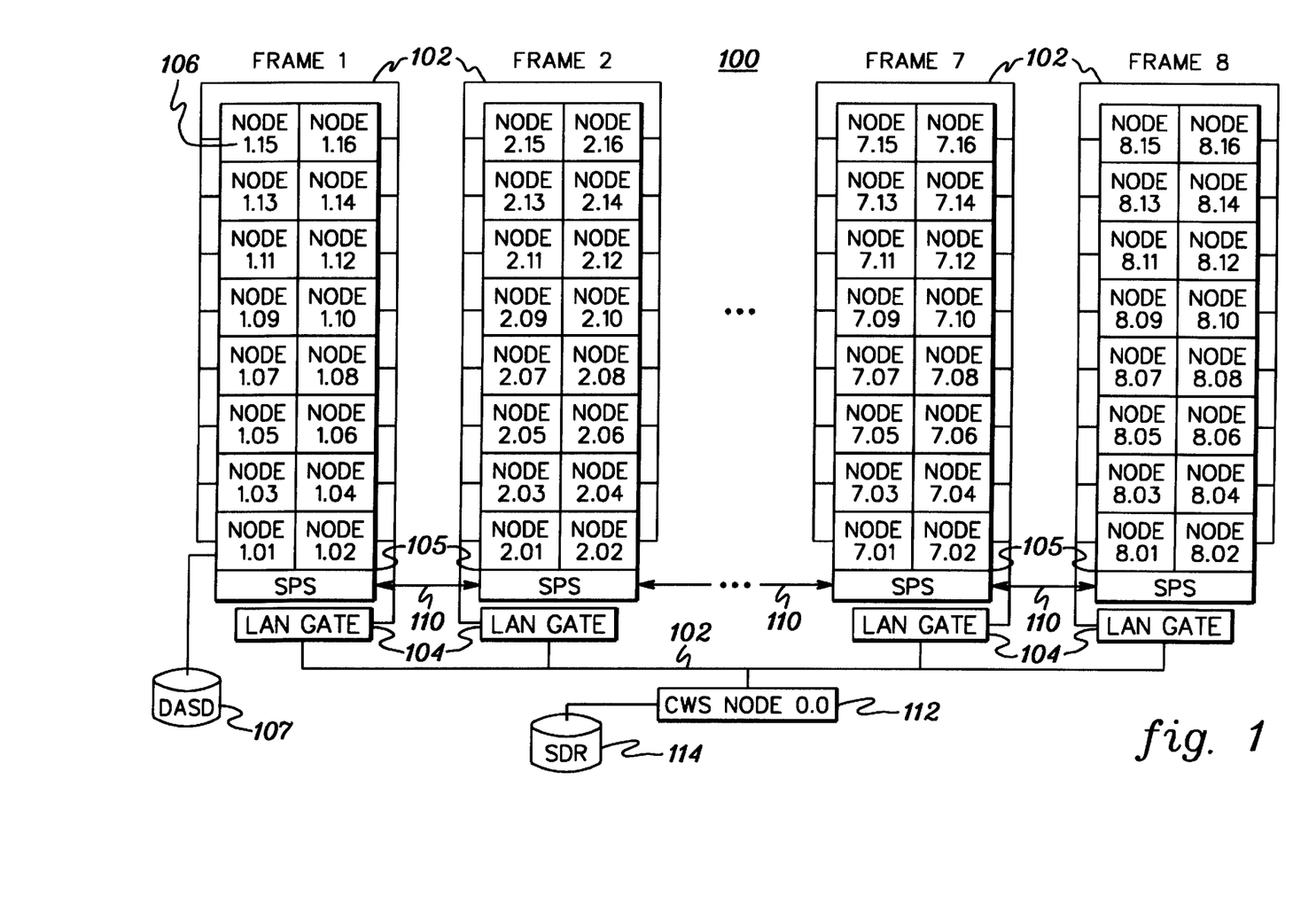
FIG. 1 is a schematic diagram of a parallel, distributed data processing system usable with the present invention.

FIG. 1 is a schematic diagram of a distributed computer system 100 useable with the present invention. The distributed computer system 100 may be an IBM RISC System/6000 Scalable POWERparallel Systems (SP) distributed computer system available from International Business Machines Corporation of Armonk, N.Y. The embodiment disclosed in FIG. 1 is an SP computer having a total of 8 frames, with each frame having up to 16 nodes, for a total of 128 nodes. All of the nodes 106 are joined by a local area network (LAN) 102. Each node 106 is a computer itself, and may be a RISC System/6000 workstation, as is well-known by those skilled in the art.

All of the nodes in a frame of the SP computer 100 are included in a LAN segment which is joined by the other LAN segments through LAN gates 104. Also connected to the LAN 102, is a control workstation (CWS) 112 which controls operation of the SP computer 100. The control workstation has a direct access storage device (DASD) 114 referred to as the System Shared Disk on which is stored the system data repository (SDR) files. The SDR files include such information as a list of nodes that are in the system and their configuration, and includes resources and object definitions for each of the nodes 106. Each node 106 also includes a DASD device 107 for storing data processed by the SP computer 100.

In one embodiment, the nodes in each frame are also connected to an IBM Scalable POWERparallel switch (SPS) 105. Each of the SPS switches 105 of each frame is connected to neighboring SPS switches 105 of other frames by a bus 110.

As is well understood in the art, the CWS node 112 sends system data and control signals to the frames of the SP computer 100 by means of the LAN 102 while messages and data may be sent from one to another of the nodes 106 by means of the high performance switches 105.

Figure 2:
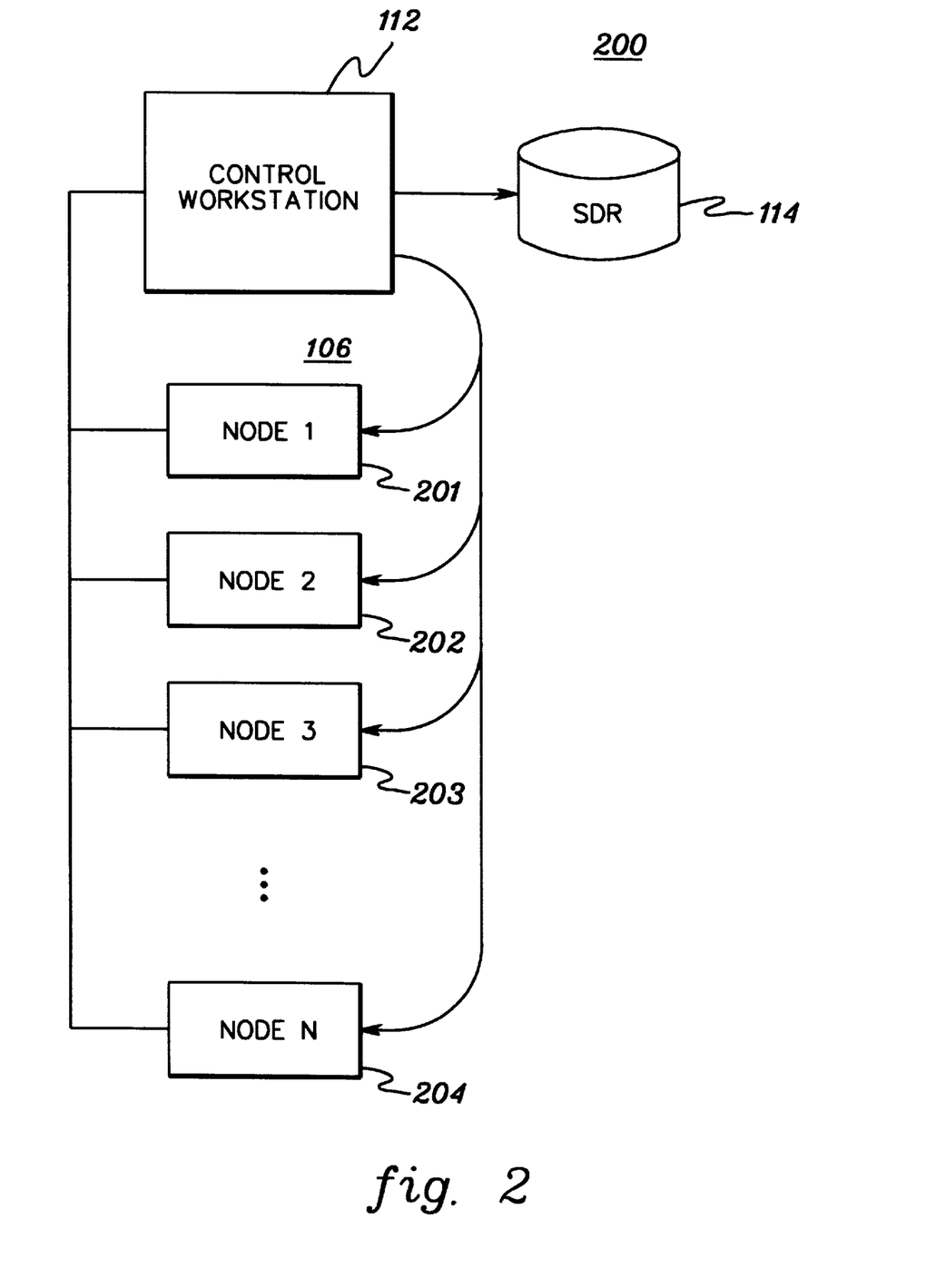
FIG. 2 is a diagram of a portion of the system of FIG. 1 illustrating a portion of the method of the present invention.

FIG. 2 is a portion of the system 100 of FIG. 1. The control workstation 112 provides a single point of control wherein the control workstation provides the interfaces to create, delete or update Volume_Group objects contained in the SDR 114. The control workstation centrally administers the mirroring, unmirroring and bootless commands to nodes 1, 2, 3 . . . N, (i.e., 201, 202, 203 . . . 204, respectively). It will be understood that each type of new operation described herein (e.g., make, delete or change a Volume Group object) is issued on the control workstation, and that the necessary data is stored in the SDR 114. It should also be understood that the number of nodes, which may be referred to as the targets or target nodes by the control workstation, may be varied to one or more as desired by the system administrator (i.e., user).

In PSSP, there is a class in the SDR called the "node class" which contains information specific to individual SP nodes.

This invention provides a new class called the "volume_group class", which contains information about the volume groups of each node. Further, the node class is expanded to have a new attribute, the selected_vg attribute, which points to a selected volume group of the volume_group class. Each Volume_Group object is unique by node, and vg_name. Each Volume_Group object has a set of attributes which describe a volume group. The volume_group attributes, their initial and legal values, as well as data types are described in Table 1.

TABLE 1

SDR Volume_Group Class Description

| Attribute Name | Type | Description | Values |
| --- | --- | --- | --- |
| node_number | I | node number for Volume_Group | an integer representing a node number |
| vg_name | S | customer supplied volume group name | customer supplied, a convenient handle for reference, initially "rootvg" |
| pv_list | S | a list of physical volumes. Valid formats are: hdisk,hdisk, . . . hdisk connwhere, connwhere, . . . connwhere location:location: . . . location | initially "hdisk0" |
| rvg | S | is this volume group a root volume group? true/false | initially "true" NOTE: rvg is always true for a current release of PSSP |
| quorum | S | is quorum on for this volume group? true/false | initially "true" |
| copies | I | number of copies for the volume group. Valid are 1 or 2 or 3 | initially 1 |
| mapping | S | Is mapping on? true/false | initially "false". NOTE: mapping is always false for this release of PSSP |
| install_image | S | mksysb image name to install next | "default" |
| code_version | S | PSSP code version to use for next install | derived from Syspar |
| lppsource_name | S | name of the lppsource resource to use for next install | "default" |
| boot_server | S | node_number of boot/install server | default depending on node location |
| last_install_time | S | a date string of when the node was last installed | initial |
| last_install_image | S | a string of the last image installed on the node | initial |
| last_bootdisk | S | The logical device name of the last volume the node booted from | initial |

Each Volume_Group object describes a volume group of the node; and collectively the Volume_Group objects of a node define all possible volume group states of the node. The Node object attribute, the selected_vg, points to an object in the Volume_Group class. The selected Volume_Group object designates a volume group for subsequent commands.

Prior to this invention, certain of the attributes associated with the Volume_Group object were associated with the Node object, since nodes had only one root volume group. With this invention, these attributes were moved to the Volume_Group object, and this allows the data to represent multiple volume groups per node.

The following is a list of new commands pursuant to the present invention. Note: the <> notation indicates a value to be filled in by the user.

```
spmkvgobj -r <vg_name>
         -l <node_list>
         -h <pv_list>
         -i <install_image>
         -v <lppsource_name>
         -p <code_version>
         -n <boot_server>
         -c < copies >
         -q < quorum >
```

The "spmkvgobj" command is used to create a Volume_Group object.

```
splstdata -v <vg_name>
          -l <node_list>
```

The "splstdata" command is used to list information about a Volume_Group object.

```
sprmvgobj -r <vg_name>
          -l <node_list>
```

The "sprmvgobj" command is used to remove a Volume_Group object.

```
spchvgobj -r <vg_name>
          -l <node_list>
          -h <pv_list>
          -i <install_image>
          -v <lppsource_name>
          -p <code_version>
          -n <boot_server>
          -c < copies >
          -q < quorum >
```

The "spchvgobj" command is used to change information associated with the current Volume_Group object.
    spmirrorvg -l <node_list>
The "spmirrorvg" command is used to initiate mirroring of Volume Groups on a node or group of nodes. The command runs remotely, and places the process in the background, allowing for parallel execution.
    spunmirrorvg -l <node_list>
The "spunmirrovg" command is used to halt mirroring on the current volume groups for a group of nodes. The command runs remotely and places the process in the background, allowing for parallel execution.

```
spbootins -c <selected Volume Group>
          -l <node_list>
```

The "spbootins" command sets the current Volume_Group object name for a node or group of nodes. The command does other things that are not relevant to this design, and not mentioned here.
    spbootlist -l <node list>
This command is used to set the bootlist on a node or group of nodes based on the combination of the mirroring and alternate volume group information for the node. If mirroring is off, the bootlist is set to a single physical volume. If mirroring is on, the bootlist is set to a list of physical volumes that provide redundant boot backups.

Figure 3:
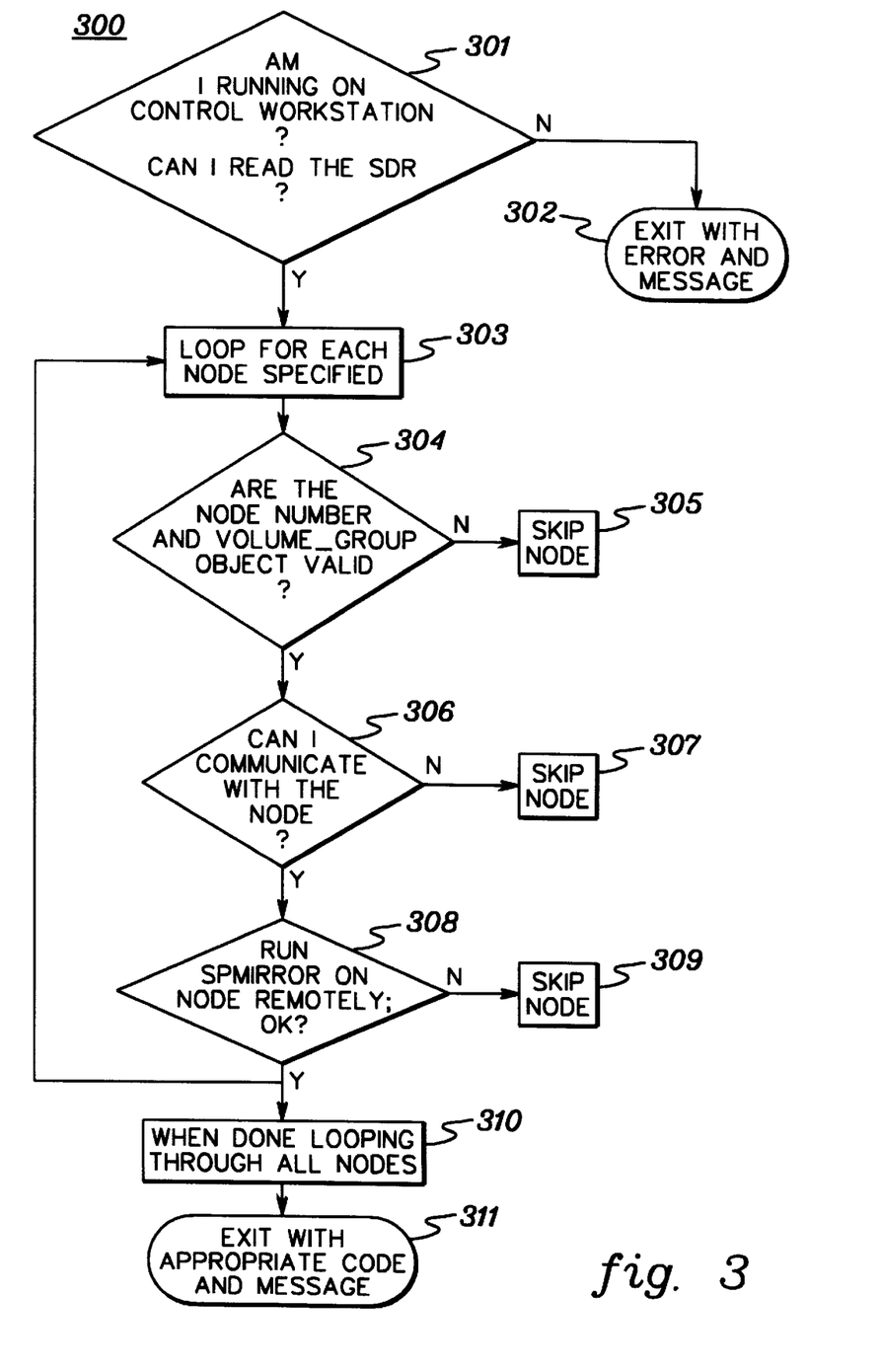
FIG. 3 is a flow diagram of the program "spmirrorvg", run on the control workstation in accordance with the present invention, showing checking of input parameters and calling of "spmirror" to initiate mirroring on a node of the system.

FIG. 3 is a flow diagram of one embodiment of mirroring 300 in accordance with the present invention. This mirroring routine ("spmirrorvg") runs on the control workstation to check the state of the SDR and the ability of the CWS to communicate with each node, for example, nodes 1, 2, 3 & N of FIG. 2. If the routine is unable to verify it is running on the control workstation or cannot read the SDR 301, then the mirroring process is exited with an error message 302. Otherwise, a sub-process is entered for each node specified in the system 303. Within this sub-routine, processing first determines whether the node number and Volume_Group object are valid for the particular node 304. If "no", mirroring at that node is skipped 305. If the node number and Volume_Group objects are valid, then processing determines whether the control workstation is in communication with the node 306. Again, if "no", the node is skipped 307. After establishing that the control workstation is in communication with the node, processing runs the command "spmirror" (FIG. 4) remotely on the node 308. If the control workstation is unable to run the command, then the node is skipped 309.

The outlined sub-process preferably proceeds in parallel for each node in the distributed system. Once the processing has completed mirroring for all designated nodes 310, the mirror operation is exited with an appropriate code and message 311. Note that the "spmirrorvg" routine 300 of FIG. 3 is a script which calls routine 400 (i.e., "spmirror") of FIG. 4 and reports any errors in mirroring back to the system administrator.

Figure 4:
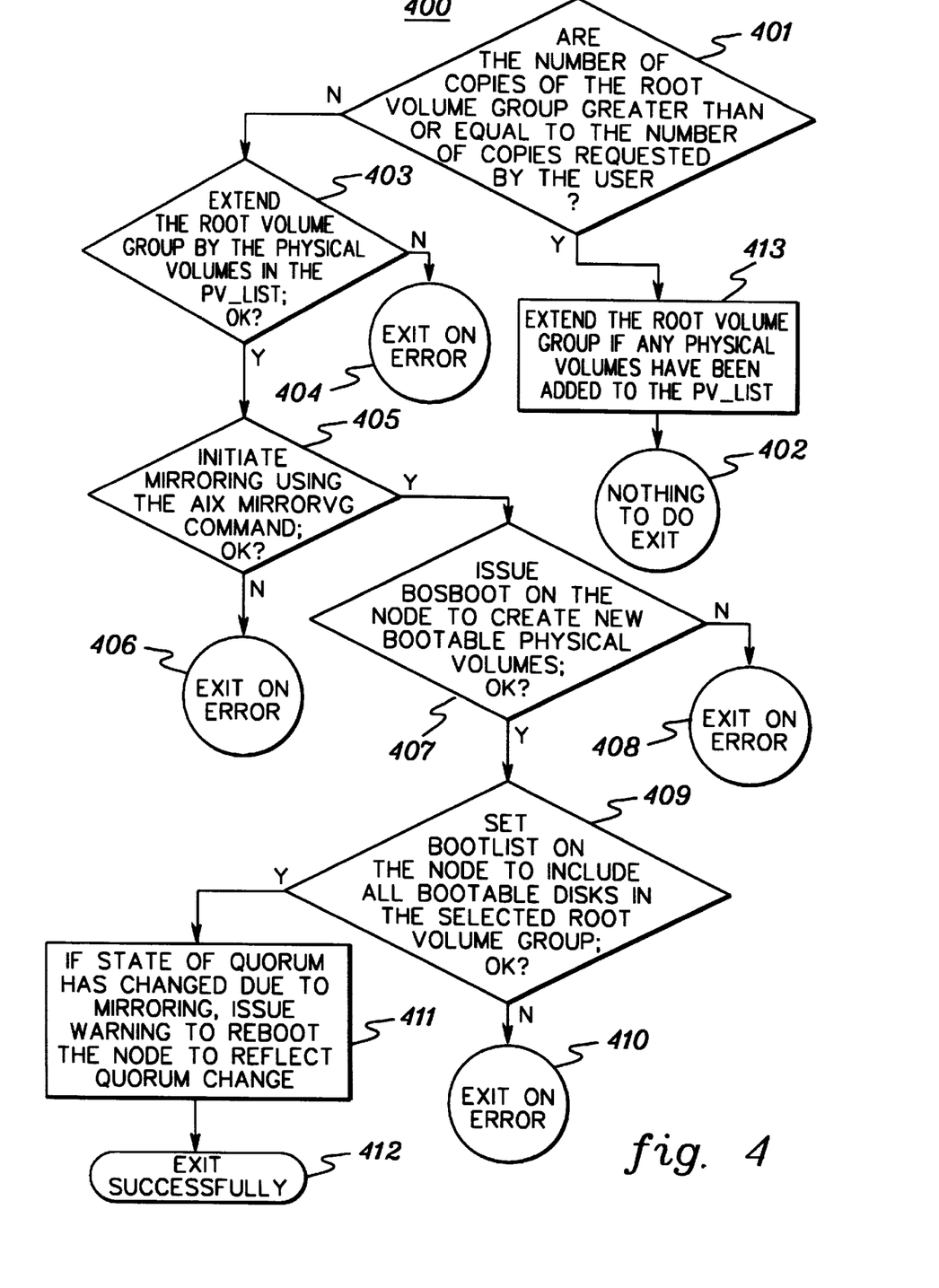
FIG. 4 is a flow diagram of the remote running of "spmirror" of FIG. 3, identifying steps to be taken by a node to perform mirroring in accordance with the present invention.

FIG. 4 illustrates the lower level mirroring program, "spmirror", employed by inquiry 308 of FIG. 3. "Spmirror" checks to see if mirroring is already in the desired state on the node and proceeds if the number of copies requested by the user in the SDR is unfulfilled, i.e., are the number of copies of the root volume group greater than or equal to the number of copies requested by the user? 401. If "yes", extend the volume group by any new physical volumes in the pv_list 413, after which processing exits the routine since the number of mirrored copies of the volume group already exists 402. If there are additional physical volumes to be placed in the volume group, the volume group is extended to include them 403. If processing is unable to extend the root volume group by the physical volumes in the pv_list, an error has occurred and processing is exited 404.

The AIX mirroring command "mirrorvg" is then called to initiate mirroring of the volume group at the node 405. The "mirrorvg" AIX command (as well as the other AIX commands referenced herein) is described, for example, in an IBM publication entitled "AIX Version 4.3 Commands Reference", Volumes 1–6, First Edition October 1997, the entirety of which is hereby incorporated herein by reference. If mirroring is unable to be initiated, processing exits with an error 406. After mirroring, the AIX commands "bosboot" 407 and "bootlist" 409 are called to make the new mirrored disk bootable, and to set the order of booting on the node to include the new mirrored disk. If either the "bosboot" or "bootlist" AIX commands are not properly performed, processing exits 408 & 410, respectively. If the state of quorum changed on the node, a message is sent to the user to reboot the node 411, thus successfully completing the mirroring process 412.

Figure 5:
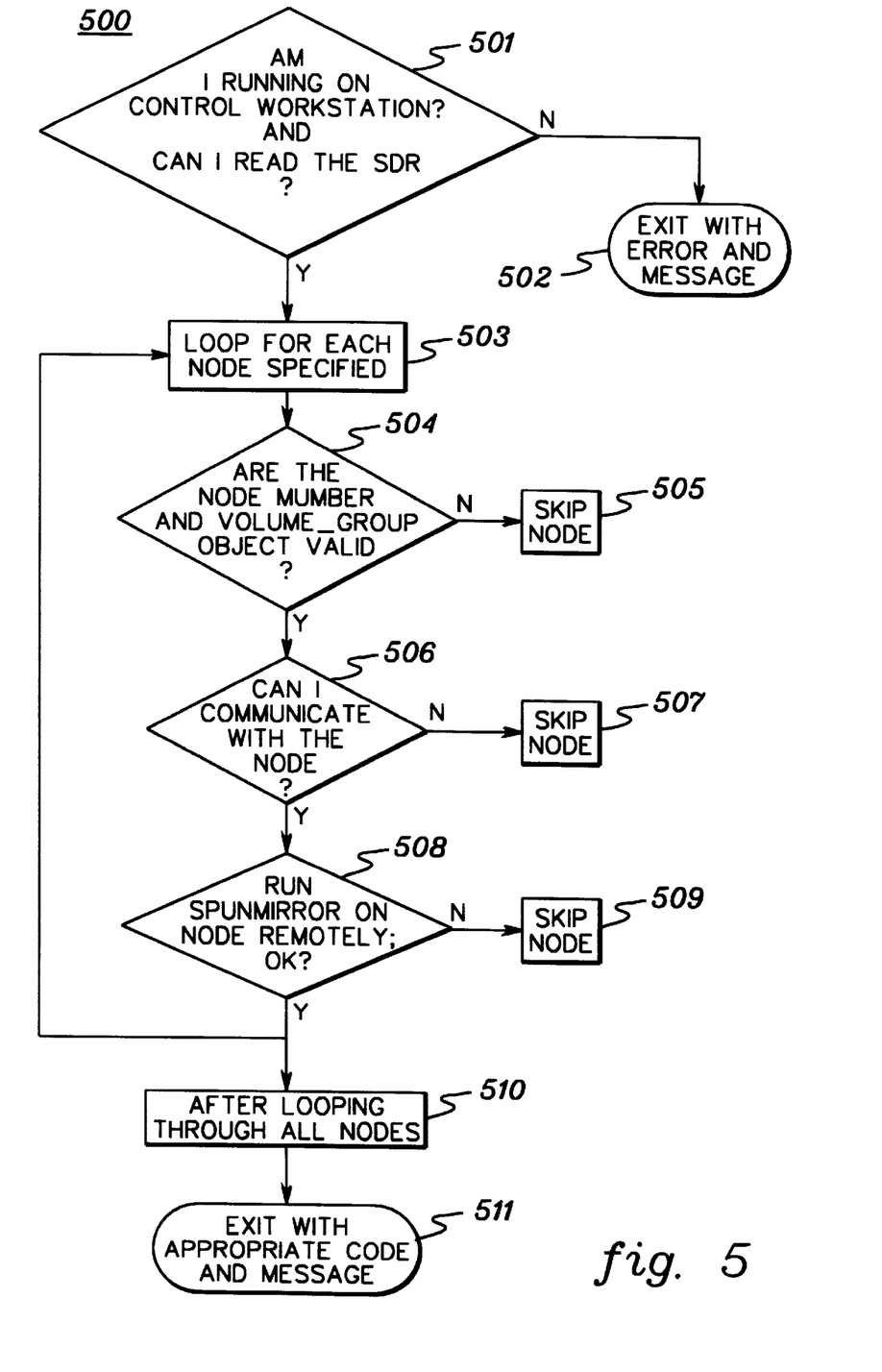
FIG. 5 is a flow diagram of the program "spunmirrorvg", run on the control workstation in accordance with the present invention, and showing checking of input parameters and calling of "spunmirror" to initiate unmirroring on a node of the system.

FIG. 5 illustrates one embodiment of unmirroring processing 500 in accordance with the present invention. This unmirroring process 500 is implemented on the control workstation, and begins by checking the state of the SDR and the ability of the control workstation to communicate with the SDR 501. If either inquiry fails, then the unmirroring process is exited with an error message 502. Assuming that the unmirroring routine is running on the control workstation and the control workstation can read the SDR, then a parallel implemented sub-routine is entered 503 which is performed for each designated node of the distributed system. Processing initially determines whether the node number and Volume_Group objects are valid 504. If "no", then the node is skipped 505. Next, the unmirroring process determines whether the control workstation can communicate with the given node 506, and if "no", processing at that node is skipped 507. Assuming that communication is established, the command "spunmirror" (FIG. 6) is run on the node remotely 508. If the command is unable to be processed, the node is skipped 509. After completing the designated processing for each selected node of the distributed system 510, preferably in parallel, the unmirroring process is exited with an appropriate code and message 511. Note that the "spunmirrorvg" routine 500 is a script which calls the command "spunmirror" 600 depicted in FIG. 6 and reports any errors in unmirroring back to the user.

Figure 6:
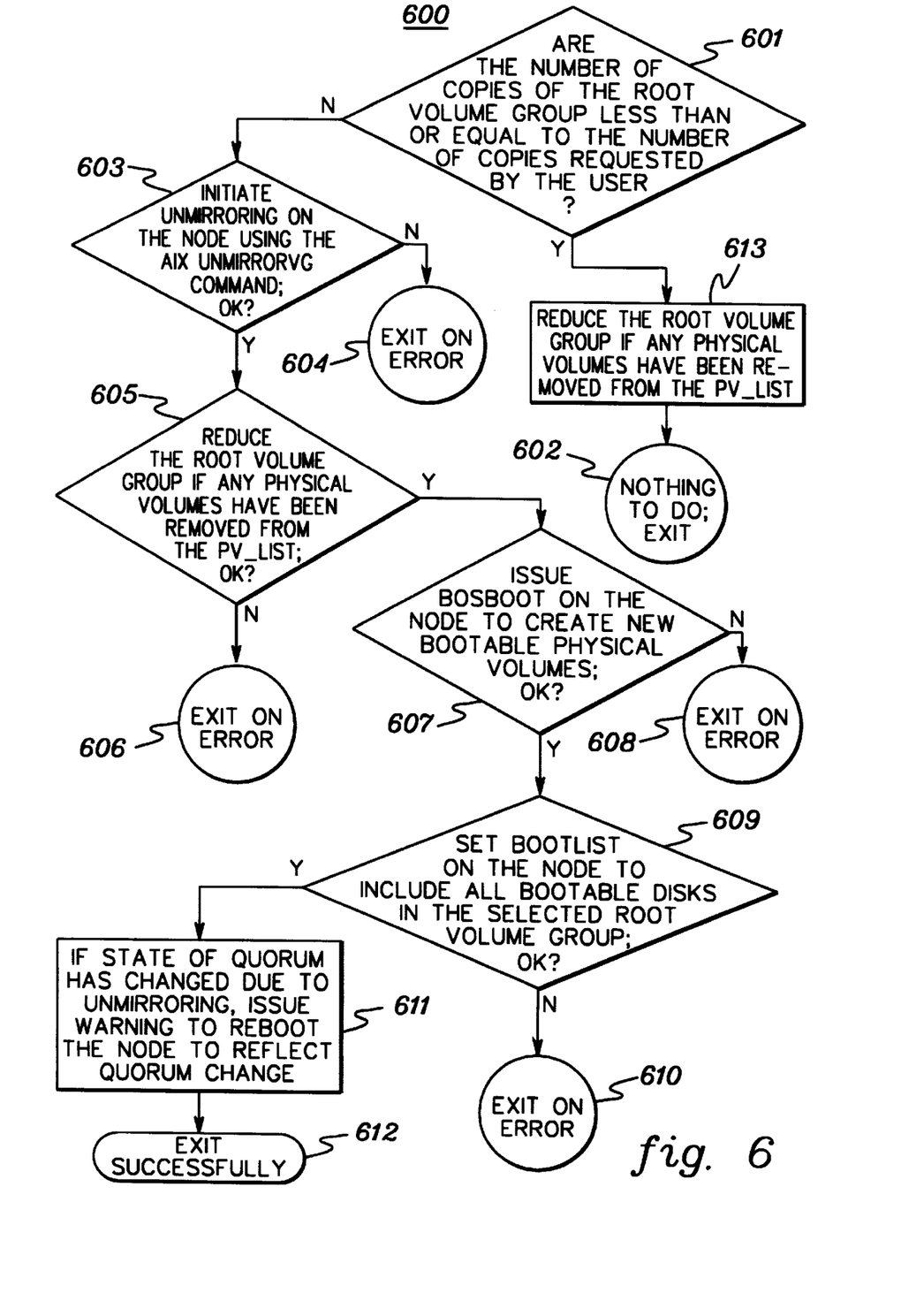
FIG. 6 is a flow diagram of the run "spunmirror" step of the flow diagram of FIG. 5, detailing the steps to be taken on a node to perform unmirroring in accordance with the present invention.

As noted, the lower level unmirroring process "spunmirror" is depicted in FIG. 6, which is an expansion of block 508 of FIG. 5. Spunmirror initially checks to see if mirroring is already in the desired state on the node, and proceeds if the reduced number of copies requested by the user in the SDR is unfulfilled 601. If the reduced number of copies of the volume groups already exists, "spunmirror" reduces the volume group if any physical volumes have been removed from the pv_list 613, and then processing is terminated 602. Otherwise, the AIX unmirroring command "unmirrorvg" is called 603. The command "unmirrorvg" is part of the AIX operating system and is discussed in the above-incorporated IBM publication. If unmirroring cannot be initiated, processing is exited 604. After unmirroring, if there are any physical volumes in the volume group that need to be taken out, the AIX command "reducevg" is run to reduce the volume group and make the physical volumes available for another use 605. If the root volume group cannot be reduced, error is indicated 606. After unmirroring, the AIX commands "bosboot" 607 and "bootlist" 609 are called for updating of the node information to reflect the disks which have been removed from the volume group. If either the "bosboot" or "bootlist" AIX commands are not properly performed, processing exits 608 & 610, respectively. Finally, if the state of quorum has changed on the node, a message is sent to the user to reboot the node 611, thus successfully completing the unmirroring process 612.

Figure 7:
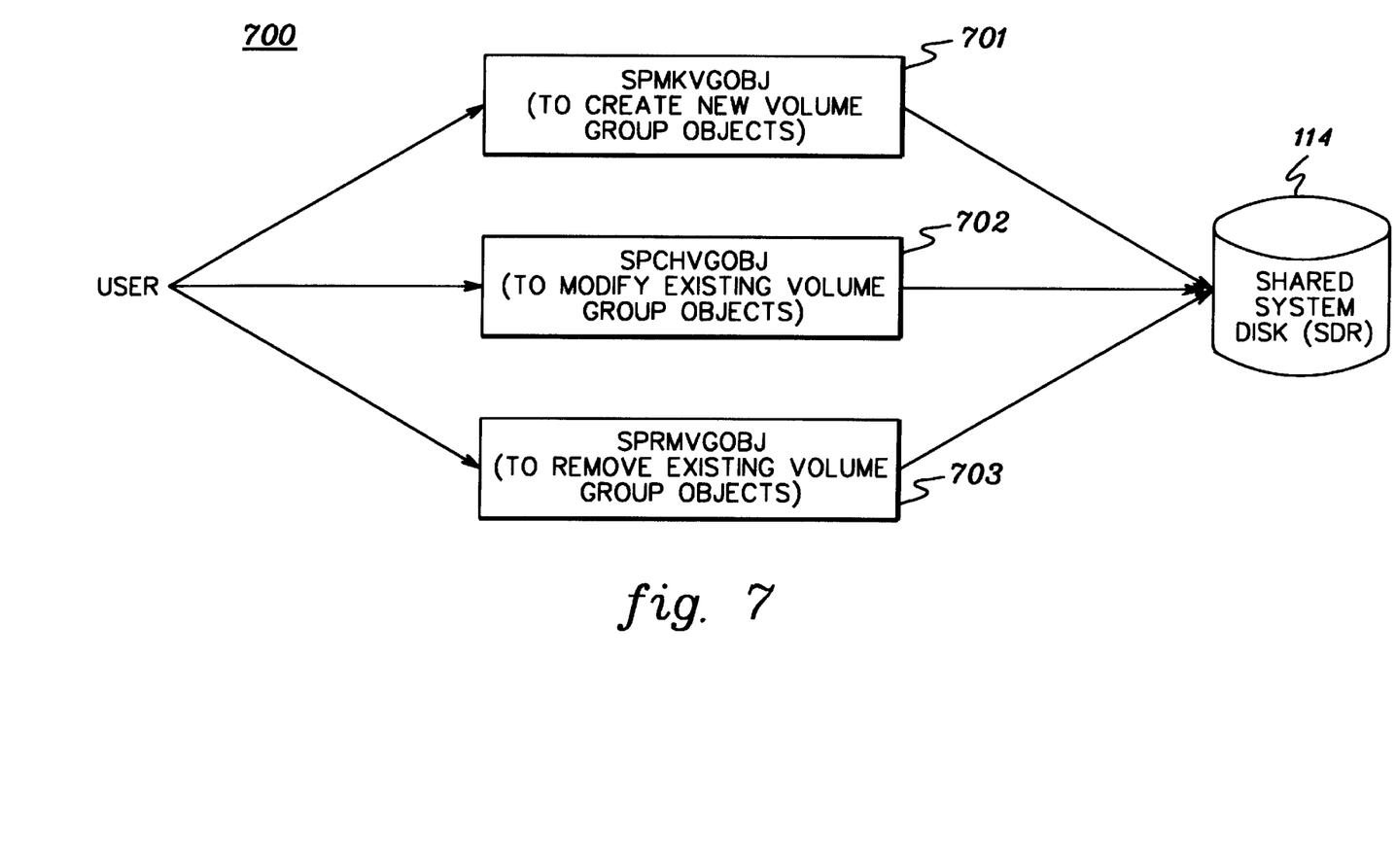
FIG. 7 is a flow diagram of user-initiated adding, modifying and deleting of Volume_Group objects in the SDR in accordance with the present invention.

FIG. 7 is a flow diagram of user initiated processings 700 for making, changing or removing a Volume_Group object in accordance with the present invention. Three new commands are provided herein, i.e., "spmkvgobj" 701, "spchvgobj" 702, and "sprmvgobj" 703. Each of these commands interacts with information in the SDR 114. The "spmkvgobj" command is used to create a new Volume_Group object, the "spchvgobj" command is employed to modify an existing Volume_Group object, and the "sprmvgobj" command is used to remove an existing Volume_Group object from the repository 114. Again, these Volume_Group objects represent the information used by other commands described herein, such as "spmirrorvg" and "spunmirrorvg" when initiating or discontinuing mirroring on a target node. Processing pursuant to the "spmkvgobj", "spchvgobj", and "sprmvgobj" commands is presented in greater detail in FIGS. 8, 9 & 10, respectively.

Figure 8:
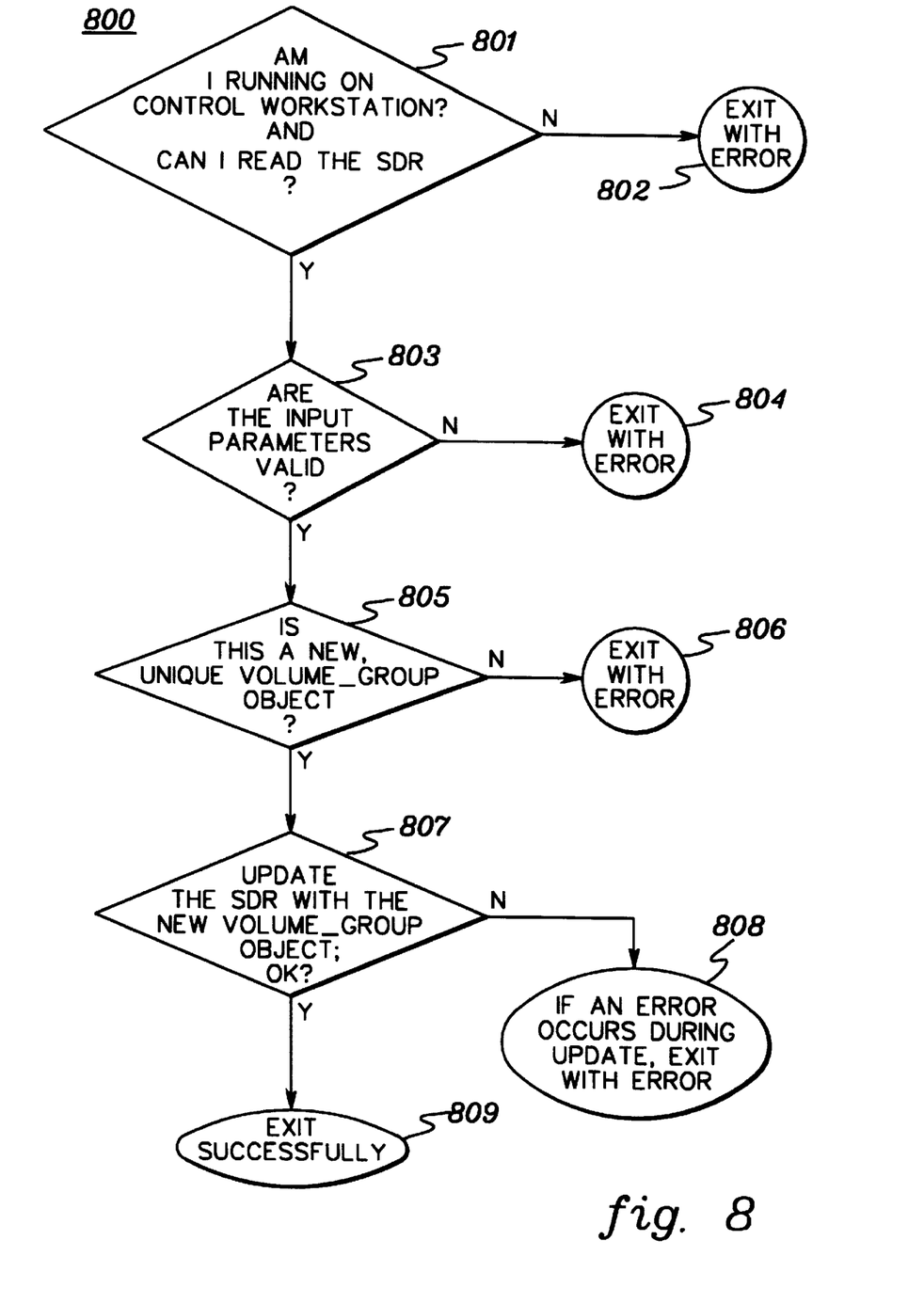
FIG. 8 is a flow diagram of the program "spmkvgobj", run on the control workstation in accordance with the present invention, for creating a Volume_Group object for a node of the system.

FIG. 8 is a flow diagram of the user-initiated process 800 for making a Volume_Group object in accordance with the present invention. This process is initiated by invoking the "spmkvgobj" command to create a new Volume_Group object. Processing begins by checking the input parameters to make sure that "spmkvgobj" is running on the control workstation and that the control workstation can read the system repository 801. If "no", processing is terminated with an error message 802. Assuming that the program is running on the control workstation and the control workstation is in communication with the SDR, processing determines whether the user-inputted parameters are valid 803. If "no", processing terminates 804. Next, processing determines whether the Volume_Group object to be created already exists for the particular node 805. If the Volume_Group object already exists, processing exits with an error message 806. Thereafter, the routine creates the new Volume_Group object and updates the SDR 807. If an error occurs during updating of the SDR, processing exits with an appropriate error code and message 808. Otherwise, the Volume_Group object has been successfully created and processing ends 809.

Figure 9:
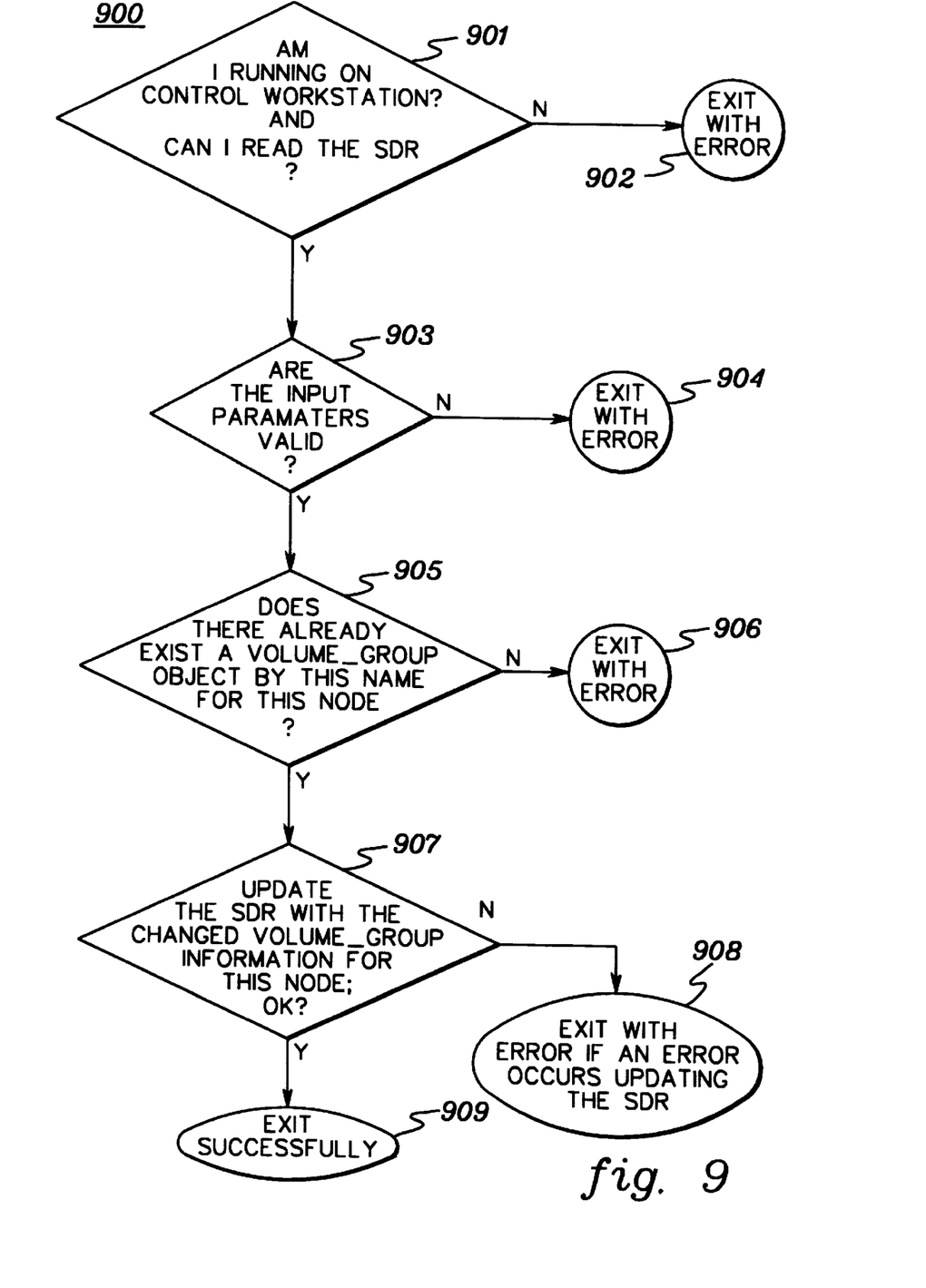
FIG. 9 is a flow diagram of the program "spchvgobj", run on the control workstation in accordance with the present invention, for changing Volume_Group object information in the system data repository.

Processing 900 for changing a Volume_Group object is depicted in FIG. 9. Again, this comprises a user-invoked command, "spchvgobj" to change an existing Volume_Group object. Processing begins by confirming that the command is running on the control workstation and that the control workstation can read the shared system repository 901. If "no", an appropriate error message is sent 902. Otherwise, the input parameters received from the user are checked to make sure that the parameters are valid 903. If "no", then processing ends with an error message 904. Assuming that the parameters are valid, processing determines whether the Volume_Group object that is about to change already exists for this node 905. If not, an error message is sent 906. Assuming that the desired Volume_Group object exists for the node, then processing changes the Volume_Group object according to the user-specified parameters 907. If the updating of the SDR with the changed volume group information fails, processing exits with an appropriate error message 908. Otherwise, the update processing of the Volume_Group object's information is successfully completed 909.

Figure 10:
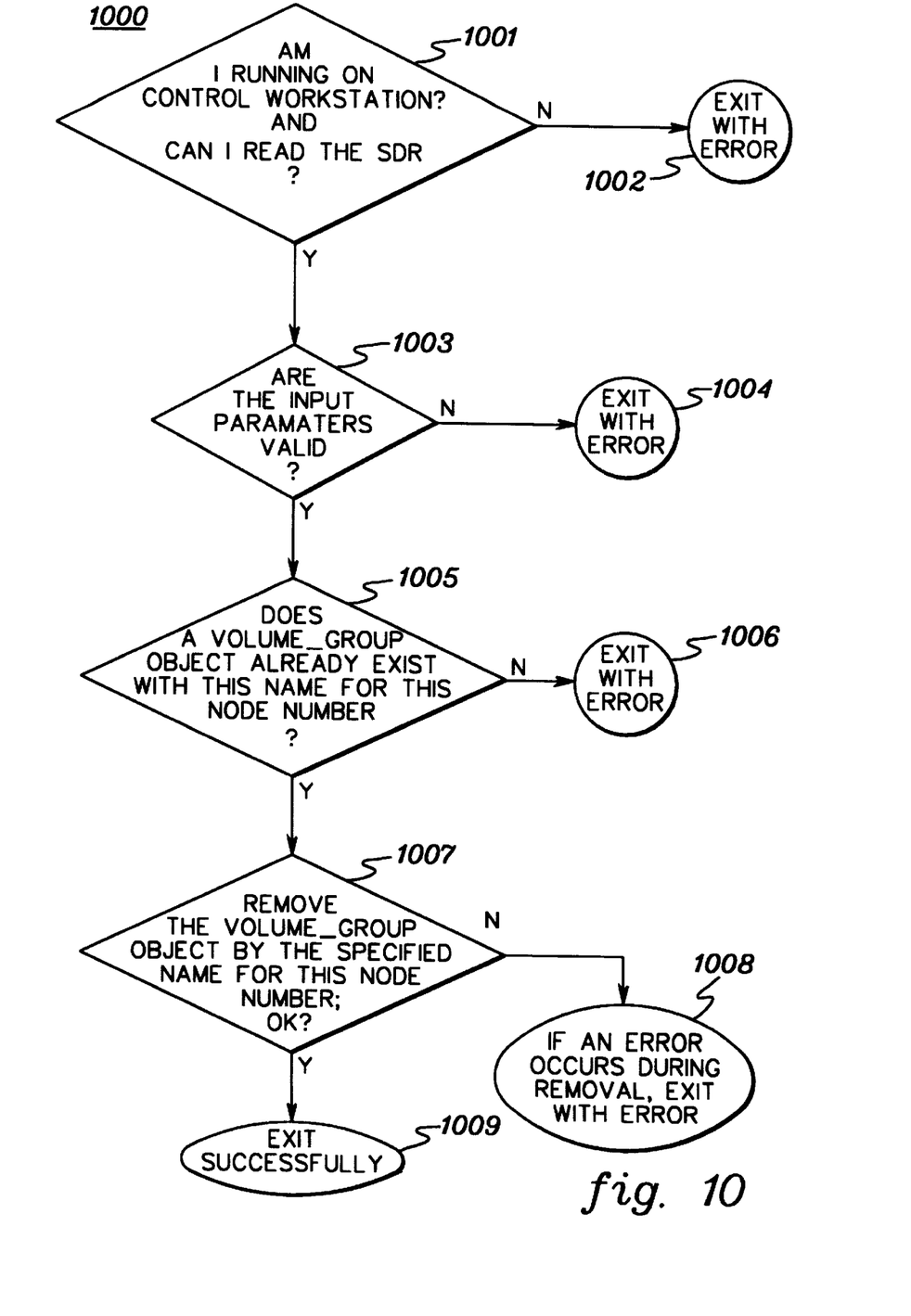
FIG. 10 is a flow diagram of the program "sprmvgobj", run on the control workstation in accordance with the present invention, for removing Volume_Group object information of a user-specified name and node number.

FIG. 10 presents a flow diagram of processing 1000 in accordance with a user-invoking the "sprmvgobj" command of the present invention to delete an existing Volume_Group object. The input parameters are initially checked to make sure that the command is running on the control workstation and that the program can read the SDR 1001. If "no", processing terminates with an error message 1002. Next, processing checks to make sure that all user parameters are valid 1003, and if not, issues an error message 1004. Assuming that the user parameters are valid, processing determines whether the Volume_Group object to be removed exists for this node 1005, and if "no", processing terminates with an error message 1006. Assuming that the Volume_Group object exists, then processing removes the object by the specified name for this particular node number 1007. If the Volume_Group object is unable to be removed, an error message occurs during the removal process 1008. Upon removal of the object, processing terminates 1009.

Several examples of volume_group processing in accordance with the present invention are described below.
Initialization When PSSP is installed on the control workstation, the Node class and Volume_Group class are created. One Node object and one Volume_Group object are created per node detected. The "selected_vg"(i.e., current volume group) attribute of the Node object is set to "rootvg", to designate the Root Volume Group. The Volume_Group Object that is created for each node has by default a "vg_name" (i.e., volume group name) of "rootvg". All the other Volume_Group attributes are initialized to default values, which indicate that "hdisk0" is the installation disk, and that mirroring is initially turned off for the volume group, i.e., the number of copies for the Volume_Group object is set to 1. See Table 1.

EXAMPLE 1

Mirroring a Volume Group at Install Time

Initialization is performed as above.

Prior to installing a node, the user executes the "spchvgobj" command to set the pv_list to the list of the physical volumes the user wants in the root volume group, and sets the number of mirrored copies to 2 or 3 (in this example). The user could list the information prior to installing the node using the "splstdata" command.

The user installs the node using standard PSSP procedures. When the node first boots, the "spmirrorvg" command is executed on the node to initiate mirroring.

On subsequent reboots of the node, the node writes information to the last_bootdisk attribute of the Volume_Group object. If this last_bootdisk attribute does not match the expected boot disk for the node, the user could detect that a disk has failed and that a mirrored image has become the boot image.

The "last_bootdisk" is a new attribute that is part of the Volume_Group object in accordance with the present invention. This new attribute tells the user which physical volume the node booted from. In a mirrored environment, if the value of the last_bootdisk changes, there must be a problem with a mirror of the root volume group, and this should alert the customer to a problem. The last_bootdisk is set whenever the node is booted, for example, by a program named "psspfb_script", which is an existing PSSP program not part of this disclosure.

EXAMPLE 2

Mirroring a Volume Group Post Installation

Initialization is performed as above.

To begin mirroring a volume group on a node, the user first designates the name of the mirror using the "spchvgobj" command, to set the pv_list to the name(s) of the physical volume(s) in the root volume group and sets the "copies" attribute to 2 or 3 (again by way of example).

To initiate mirroring, the user executes the "spmirrorvg" command, which executes a remote script to initiate mirroring on the node. Any error conditions that occur during mirroring are preferably displayed at the user's display console.

If multiple nodes have mirrors designated in their Volume_Group objects, and if "spmirrovg" is run with the names of many nodes, "spmirrorvg" will run across the nodes in parallel by starting background processes on every node. Again, information will come back from each process to the user's display console. Information from each process can be distinguished by a prefix to each line of output (standard PSSP code does this).

EXAMPLE 3

Installing and Selecting an Alternate Volume Group

Initialization of the data is performed as above.

By default, the volume group to be installed and booted from is the Volume_Group object with the name "rootvg", which is set during initialization of the data objects. To install and boot from an alternate volume group, the user first creates the alternate volume group in the SDR. To do this, the user executes the "spmkvgobj" command, filling in all the attributes that define the volume group. Note that the user can set AIX levels and PSSP levels to other than the values set for "rootvg".

With the alternate Volume_Group object defined, the user executes the "spbootins" command to designate the new volume group as the current volume group for the node. Using standard PSSP procedures to install the node, the node installs using the alternate volume group instead of the default volume group "rootvg". If in this example the user wishes to boot from the original "rootvg" volume group, the "selected_vg" attribute of the Node object is set to "rootvg" via the "spbootins" command. The user then executes the "spbootlist" command to set the bootlist on the node to reflect booting from "rootvg". Using standard AIX and PSSP procedures the user then reboots the node, and it would boot from the "rootvg" volume group.

The present invention can be included, for example, in an article of manufacture (e.g., one or more computer program products) having, for instance, computer usable media. This media has embodied therein, for instance, computer readable program code means for providing and facilitating the capabilities of the present invention. The articles of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. At least one computer readable medium for storing data usable by a storage controller coupled to a storage device of a distributed processing system, said at least one computer readable medium comprising:
  a data structure stored within said at least one computer readable medium, said data structure comprising:
    (i) Node object information usable by said storage controller in identifying at least one target node within the distributed processing system; and
    (ii) a Volume_Group object comprising information on at least one volume group of at last one target node in the distributed processing system, said Volume_Group object being usable by said storage controller in remotely administering volume groups of said at least one target node.

2. At least one program storage device readable by a machine, tangibly embodying at least one program of instructions executable by the machine to perform a method for administering at least one of a mirrored volume group or an alternate volume group of at least one target node of a computer system, said computer system comprising a plurality of processors coupled to a storage controller, said storage controller coupled to said storage unit, said method comprising:
  storing information in a Node object and Volume_Group object in said storage unit, said Node object and said Volume_Group object providing information on each volume group of the at least one target node in the computer system; and
  performing at the at least one target node at least one of mirroring of a volume group or designating an alternate volume group, said performing being initiated by said storage controller remote from said at least one target node.

3. An article of manufacture, comprising:
  at least one computer useable medium having computer readable program code means embodied therein for administering at least one of a mirrored volume group or an alternate volume group on at least one target node in a distributed processing system having a control node coupled to a system data repository (SDR), the computer readable program code means in the article of manufacture comprising:
    (i) computer readable program code means for causing a computer to store information in a Node object and Volume_Group object in said SDR, said Node object in said Volume_Group object providing information on each volume group of the at least one target node in the distributed processing system; and
    (ii) computer readable program code means for causing a computer to perform at the at least one target node at least one of mirroring of a volume group or designating an alternate volume group, said performing being initiated at said control node remote from said at least one target node.

4. The article of manufacture of claim 3, wherein multiple other processors are designated target nodes and said at least one target node comprises a plurality of target nodes, said computer readable program code means for causing a computer to perform comprising computer readable program code means for causing a computer to perform mirroring of a volume group or designating an alternate volume group for each node of said plurality of target nodes of the distributed processing system, and wherein said article of manufacture comprises computer readable program code means for causing a computer to initiate said performing in parallel for said plurality of target nodes.

5. The article of manufacture of claim 3, further comprising computer readable program code means for causing a computer to perform at least one of adding, deleting, modifying, or displaying information in said SDR about at least one volume group of at least one target node of the distributed processing system.

6. The article of manufacture of claim 5, wherein said computer readable program code means for causing a computer to perform at least one of adding, deleting, modifying, or displaying information in said SDR comprises computer readable program code means for causing a computer to perform at least one of adding, deleting, modifying, or displaying said Volume_Group object information for said at least one volume group of said at least one target node of the distributed processing system.

7. The article of manufacture of claim 6, wherein said computer readable program code means for causing a computer to perform comprises computer readable program code means for causing a computer to make a new Volume_Group object, wherein said making comprises receiving user-defined parameters for the new Volume_Group object, determining that said user-defined parameters comprise a new, unique Volume_Group object, and updating said SDR with the new Volume_Group object.

8. The article of manufacture of claim 6, wherein said computer readable program code means for causing a computer to perform comprises computer readable program code means for causing a computer to change said Volume_Group object information of said at least one volume group of said at least one target node, said changing including receiving user-defined parameters for said Volume_Group object, determining that said Volume_Group object exists by a user-defined name for said at least one target node, and updating said SDR with changed volume group information for said at least one target node.

9. The article of manufacture of claim 6, wherein said computer readable program code means for causing a computer to perform comprises computer readable program code means for causing a computer to remove Volume_Group object information of said at least one target node, said removing comprising receiving valid user-defined parameters for said removing, determining that said Volume_Group object exists for said at least one target node, and thereafter, removing the Volume_Group object information specified in the user-defined parameters from the SDR.

10. The article of manufacture of claim 3, wherein said computer readable program code means for causing a computer to perform comprises computer readable program code means for causing a computer to perform mirroring of said volume group of said at least one target node of the distributed processing system, said performing being initiated at said control node remote from said at least one target node, wherein said mirroring comprises for each target node:
   determining that said Node object and said Volume_Group object are valid for mirroring;
   confirming that the control node is in communication with said at least one target node; and
   initiating mirroring of said volume group from said control node remotely from said at least one target node.

11. The article of manufacture of claim 3, wherein said computer readable program code means for causing a computer to perform comprises computer readable program code means for causing a computer to perform unmirroring of said volume group of said at least one target node of the distributed processing system, said unmirroring comprising for each target node:
   determining that the Node object and Volume_Group object are valid for unmirroring;
   confirming that the control node is in communication with said at least one target node; and
   initiating unmirroring of said volume group from said control node remotely from said at least one target node.

12. The article of manufacture of claim 3, wherein said computer readable program code means for causing a computer to perform comprises computer readable program code means for causing a computer to designate said alternate volume group of said at least one target node of the distributed processing system, said designating comprising:
   designating said alternate volume group within said SDR for installation on said at least one target node; and
   invoking commands to install said alternate volume group on said at least one target node based on SDR data for said at least one target node.

13. An article of manufacture, comprising:
   at least one computer usable medium having computer readable program code means embodied therein for administering a volume group on at least one target node of a distributed processing system having multiple processors, one processor being designated a control node and one or more other processors being designated a target node, said control node being coupled to a system data repository (SDR), the computer readable program code means in the article of manufacture comprising:
   (i) computer readable program code means for causing a computer to store information in a Node object and a Volume_Group object in said SDR, said Node object and said Volume_Group object providing information on each volume group of the at least one target node in the distributed processing system; and
   (ii) computer readable program code means for causing a computer to perform at the control node at least one of adding, deleting, modifying, or displaying information about at least one volume group of said at least one target node of the distributed processing system using at least one of said Node object and said Volume_Group object in said SDR.

14. The article of manufacture of claim 13, wherein said computer readable program code means for causing a computer to perform at least one of adding, deleting, modifying, or displaying information comprises computer readable program code means for causing a computer to perform at least one of adding, deleting, modifying, or displaying said volume_group information for said at least one volume group of said at least one target node of the distributed processing system.

15. The article of manufacture of claim 13, further comprising computer readable program code means for causing a computer to provide an interface to allow a user to control said computer readable program code means for causing a computer to perform at least one of adding, deleting, modifying, or displaying information about said at least one volume group of said at least one target node of the distributed processing system.

16. The article of manufacture of claim 13, wherein said computer readable program code means for causing a computer to perform comprises computer readable program code means for causing a computer to make a new Volume_Group object, wherein said making comprises receiving user-defined parameters for the new Volume_Group object, determining that said user-defined parameters comprise a new, unique Volume_Group object, and updating the SDR with the new Volume_Group object.

17. The article of manufacture of claim 13, wherein said computer readable program code means for causing a computer to perform comprises computer readable program code means for causing a computer to change said Volume_Group object information of said at least one volume group of said at least one target node, said changing including receiving user-defined parameters for said Volume_Group object, determining that said Volume_Group object exists for said at least one target node, and updating the SDR with changed volume group information for said at least one target node.

18. The article of manufacture of claim 13, wherein said computer readable program code means for causing a computer to perform comprises computer readable program code means for causing a computer to remove Volume_Group object information for said at least one volume group of said at least one target node, said removing comprising receiving valid user-defined parameters for said removing, determining that said Volume_Group object exists for said at least one target node, and thereafter, removing the Volume_Group object information specified in the user-defined parameters from the SDR.

* * * * *